(12) United States Patent
Briggs

(10) Patent No.: US 8,910,391 B2
(45) Date of Patent: Dec. 16, 2014

(54) NON-ARTICULATED PORTABLE CMM

(71) Applicant: Faro Technologies, Inc., Lake Mary, FL (US)

(72) Inventor: Clark H. Briggs, DeLand, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 211 days.

(21) Appl. No.: 13/748,795

(22) Filed: Jan. 24, 2013

(65) Prior Publication Data

US 2014/0202015 A1   Jul. 24, 2014

(51) Int. Cl.
 *G01B 5/012* (2006.01)
 *G01B 11/16* (2006.01)
 *G01B 11/24* (2006.01)

(52) U.S. Cl.
 CPC .............. *G01B 5/012* (2013.01); *G01B 11/18* (2013.01); *G01B 11/24* (2013.01)
 USPC ........................................................... 33/503

(58) Field of Classification Search
 USPC .................................................. 33/503, 556
 See application file for complete search history.

(56) References Cited

U.S. PATENT DOCUMENTS

| | | | |
|---|---|---|---|
| 6,822,749 B1 * | 11/2004 | Christoph | 33/503 |
| 7,772,541 B2 | 8/2010 | Froggatt et al. | |
| 7,781,724 B2 | 8/2010 | Childers et al. | |
| 2005/0150123 A1 * | 7/2005 | Eaton | 33/503 |
| 2005/0151963 A1 * | 7/2005 | Pulla et al. | 33/503 |
| 2008/0302200 A1 | 12/2008 | Tobey | |
| 2011/0061253 A1 * | 3/2011 | Jonas et al. | 33/503 |
| 2013/0019488 A1 * | 1/2013 | McMurtry et al. | 33/503 |
| 2013/0025144 A1 * | 1/2013 | Briggs et al. | 33/503 |
| 2013/0050701 A1 * | 2/2013 | Jensen et al. | 33/503 |
| 2013/0111774 A1 * | 5/2013 | McMurtry et al. | 33/503 |
| 2014/0101953 A1 * | 4/2014 | Briggs et al. | 33/503 |
| 2014/0215841 A1 * | 8/2014 | Danbury et al. | 33/503 |

\* cited by examiner

*Primary Examiner* — G. Bradley Bennett
(74) *Attorney, Agent, or Firm* — Cantor Colburn LLP

(57) ABSTRACT

A portable articulated arm coordinate measuring machine (AACMM) for measuring three-dimensional coordinates of an object in space is provided including a base and a positionable arm coupled to the base. The arm has at least one arm segment including a position transducer for producing a position signal. An electronic circuit receives the position signal from the at least one position transducer. A non-articulated measurement device, coupled to the arm, includes a flexible member having at least one sensing element configured to sense deflection of the flexible member. A probe of the flexible member contacts a surface of an object. A processing unit coupled to the sensing element determines the position and shape of the flexible member. A processor, coupled to the electronic circuit, determines the three-dimensional coordinates of a point on the object in response to position signal from the position transducer and the position signals from the processing unit.

19 Claims, 14 Drawing Sheets

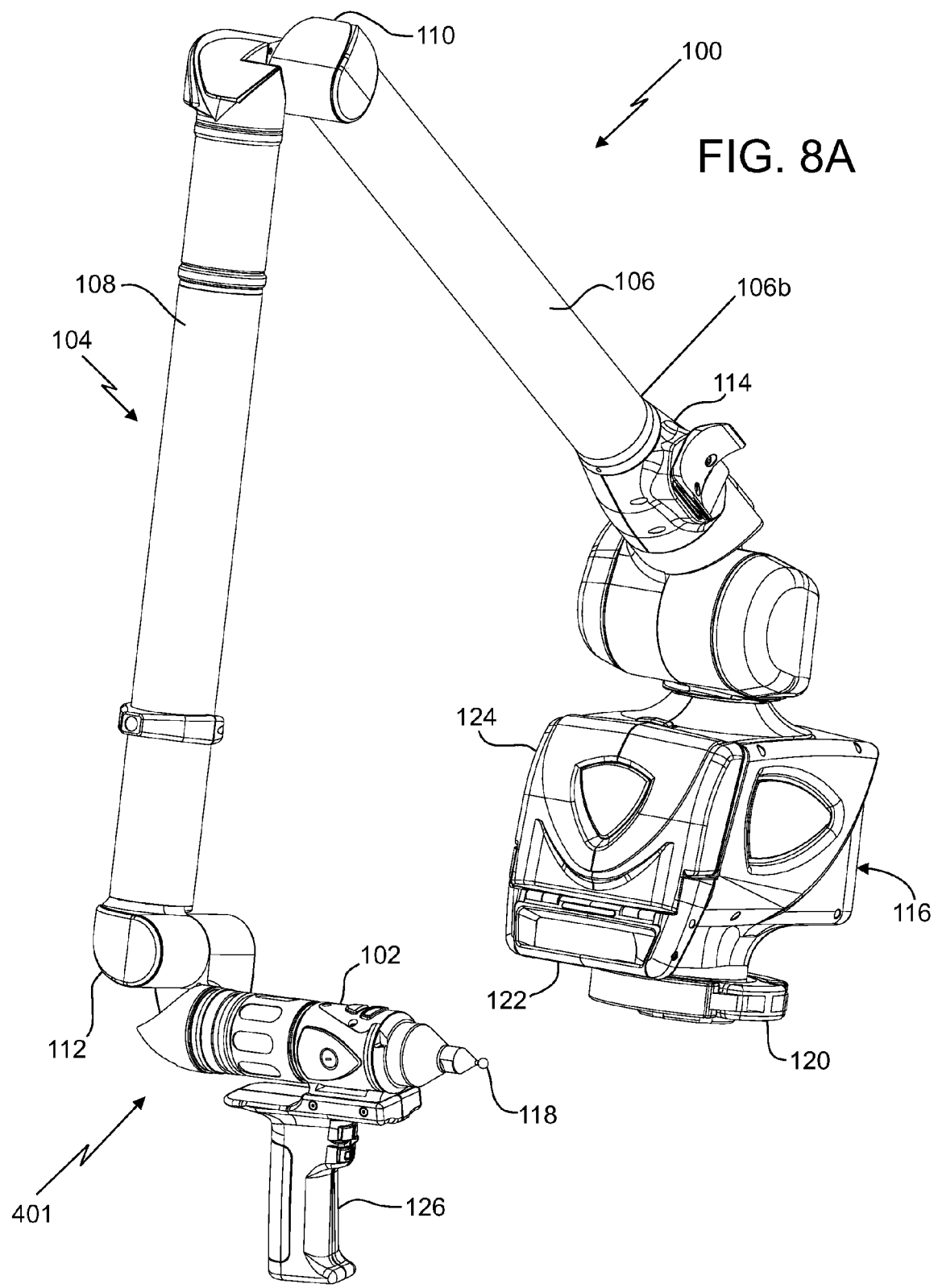

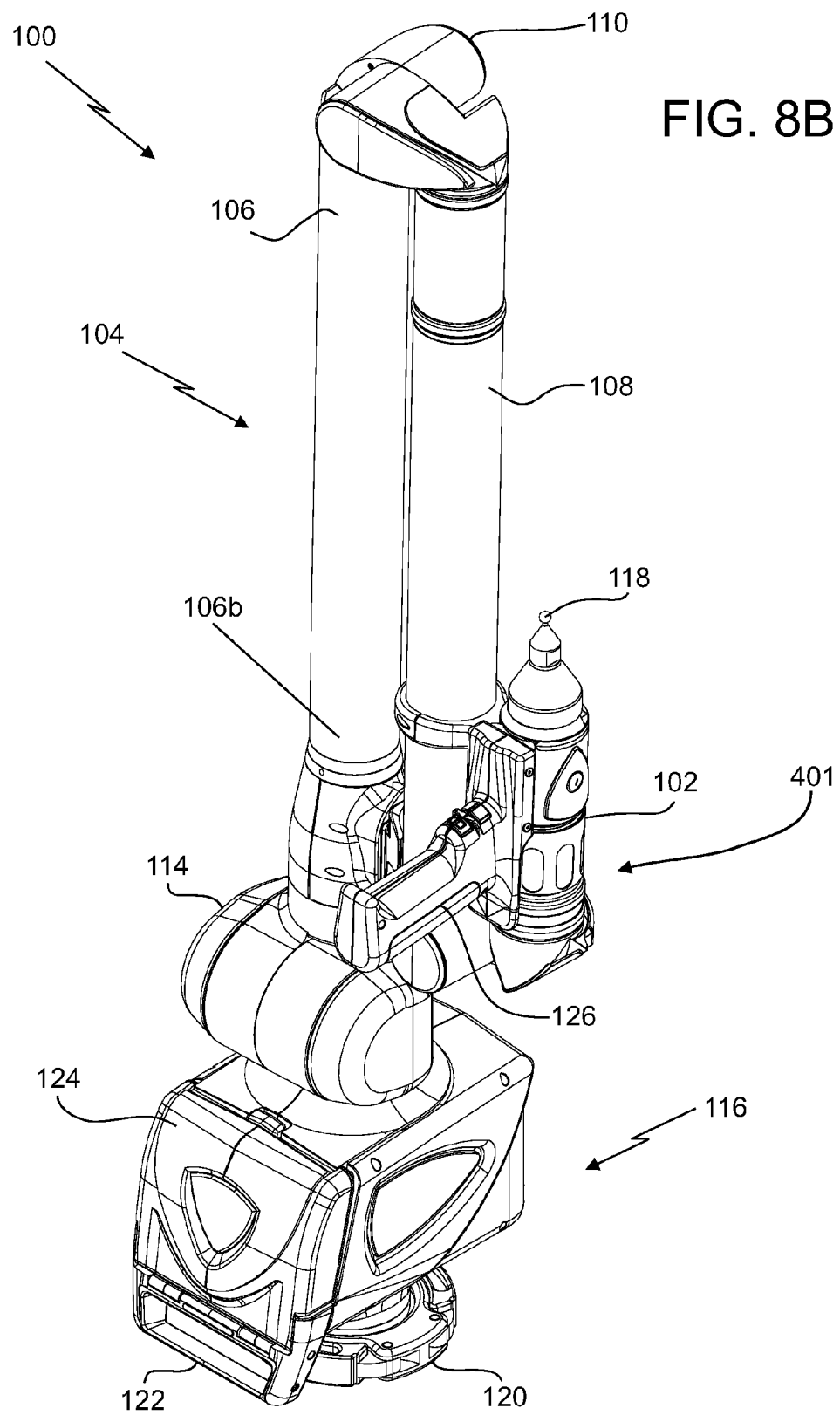

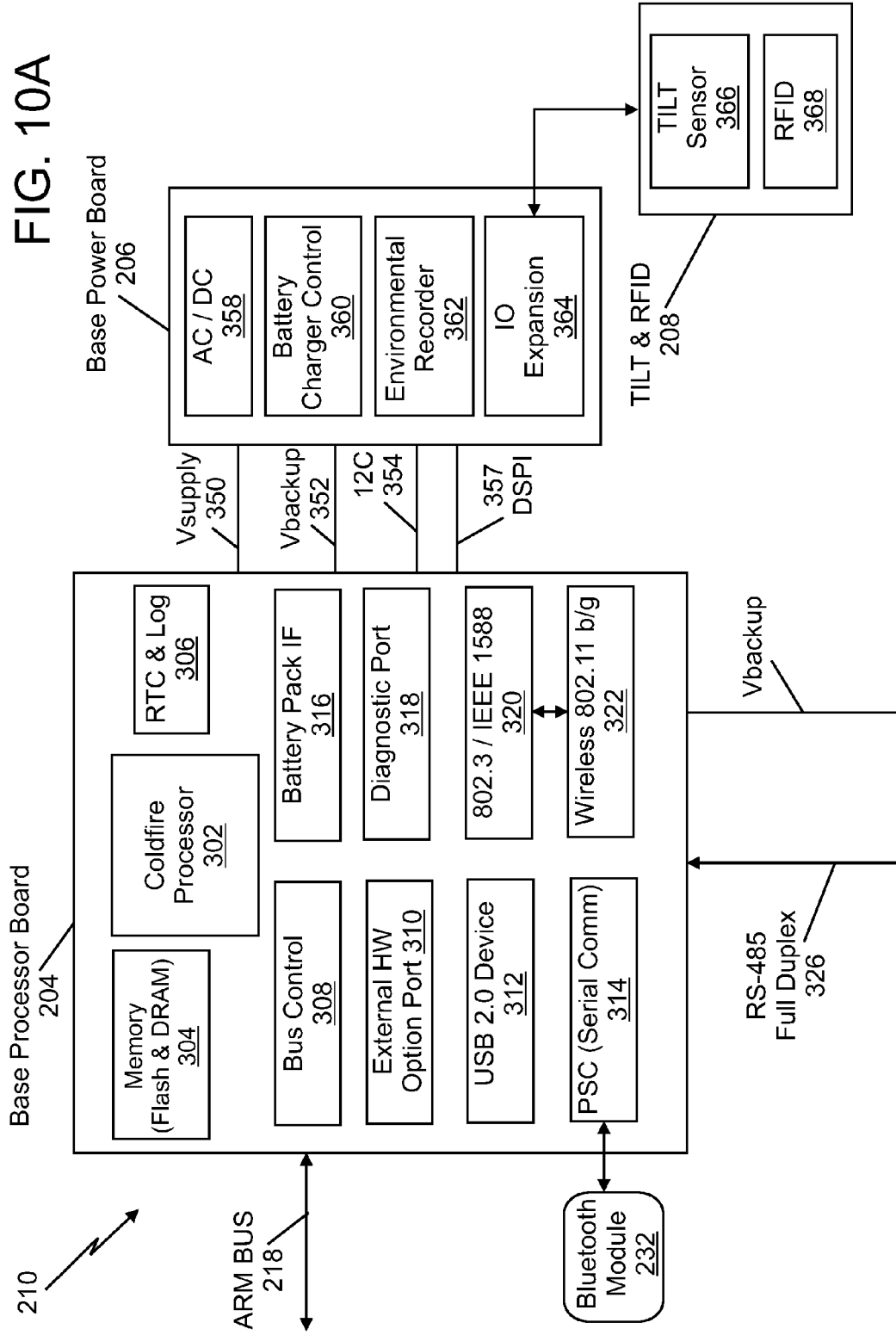

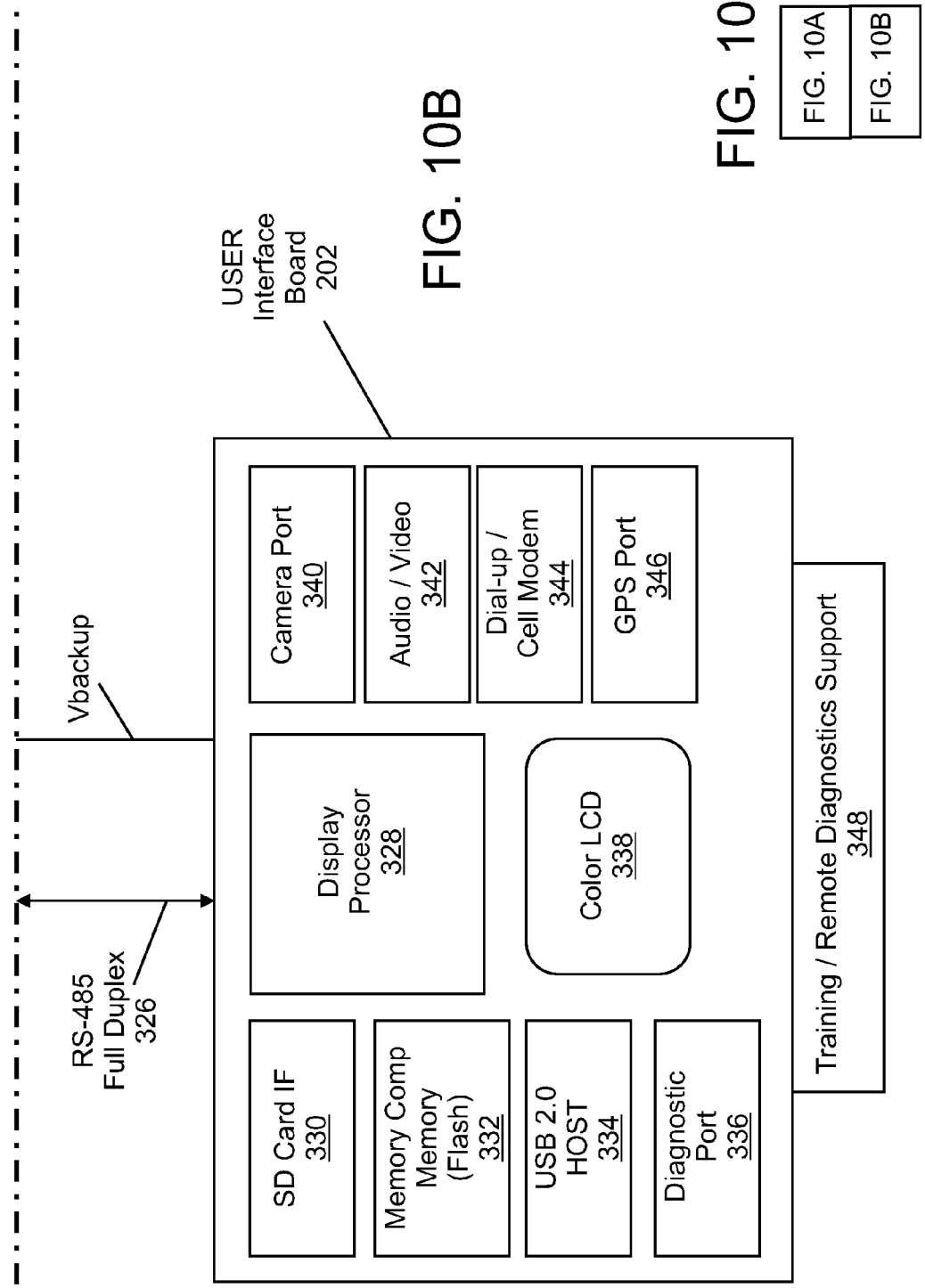

NON-ARTICULATED PORTABLE CMM

BACKGROUND

The present disclosure relates to a coordinate measuring machine and, more particularly, to a non-articulated portable coordinate measuring machine.

Portable articulated arm coordinate measuring machines (AACMMs) have found widespread use in the manufacturing or production of parts where there is a need to rapidly and accurately verify the dimensions of the part during various stages of the manufacturing (e.g. machining) or production of the part. Portable AACMMs represent a vast improvement over known stationary or fixed, cost-intensive, and relatively difficult to use measurement installations, particularly in the amount of time it takes to perform dimensional measurements of relatively complex parts. Typically a user of a portable AACMM simply guides a probe along the surface of the part or object to be measured. The measurement data are then recorded and provided to the user. In some cases, the data are provided to the user in visual form, for example, three dimensional (3-D) form on a computer screen. Alternatively, the data may be provided to the user in numeric form, for example, when measuring the diameter of a hole, the text "Diameter=" is displayed on a computer screen.

Conventional AACMMs include a plurality of axially rotating joints connected by rigid arm segments. The overall range of motion of the AACMM is determined by the number of rotating joints as well as the length of each rigid arm segment. Common configurations of a portable AACMM system include three or four rigid arm segments pivotable about six or seven axes of rotation. Because each arm segment is rigid, and each rotating joint is rotatable about only one axis, movement of a portable AACMM is inherently limited. For example, a portable AACMM cannot bend to measure between two curved concentric surfaces positioned relatively close to one another.

SUMMARY

According to one embodiment of the invention, a portable articulated arm coordinate measuring machine (AACMM) for measuring three-dimensional coordinates of an object in space is provided including a base and a manually positionable arm rotationally coupled to the base at a first end. The arm has at least one arm segment. Each arm segment includes at least one position transducer for producing a position signal. An electronic circuit is configured to receive the position signal from the at least one position transducer. A non-articulated measurement device is coupled to the second end of the arm. The non-articulated measurement device includes a flexible member having at least one sensing element configured to sense deflection of an adjacent portion of the flexible member. A probe connected to the second end of the flexible member is configured to contact a surface of an object. A processing unit is operably coupled to the at least one sensing element to sense deflection thereof. The processing unit has a stored model of the flexible member such that the processing unit is configured to apply the deflection sensed of the at least one sensing element to the model to determine the position and shape of the flexible member. The AACMM also includes a process coupled to the electronic circuit. The processor is configured to determine the three-dimensional coordinates of a point on the object in response to receiving the position signals from the at least one position transducer and in response to receiving position signals from the processing unit.

According to another embodiment of the invention, a method of operating a portable articulated arm coordinate measuring machine for measuring three dimensional coordinates of an object in space is provided including a manually positionable arm including one or more arm segments having at least one position transducer. Each position transducer produces at least one position transducer signal. The position signals from the position transducers are received by an electronic circuit. A measurement device attachment is coupled to the arm and the electronic circuit. The attachment includes a flexible member having at least one sensing element. A local bend measurement of the flexible member is determined based on the deflection of the at least one sensing element of the flexible member. The local bend measurement is applied to a stored model of the flexible member to determine a position and shape of the flexible member. Three-dimensional coordinates of a point on the object are determined based at least in part on the determined position and shape of the flexible member and the position signals.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 8, including FIGS. 8A, 8B, 8C, and 8D, are perspective views of a portable articulated arm coordinate measuring machine (AACMM) having embodiments of various aspects of the present invention therewithin;

FIG. 10, including FIGS. 10A and 10B taken together, is a block diagram describing detailed features of the electronic data processing system of FIG. 9 in accordance with an embodiment of the present invention.

DETAILED DESCRIPTION

Figure 1:
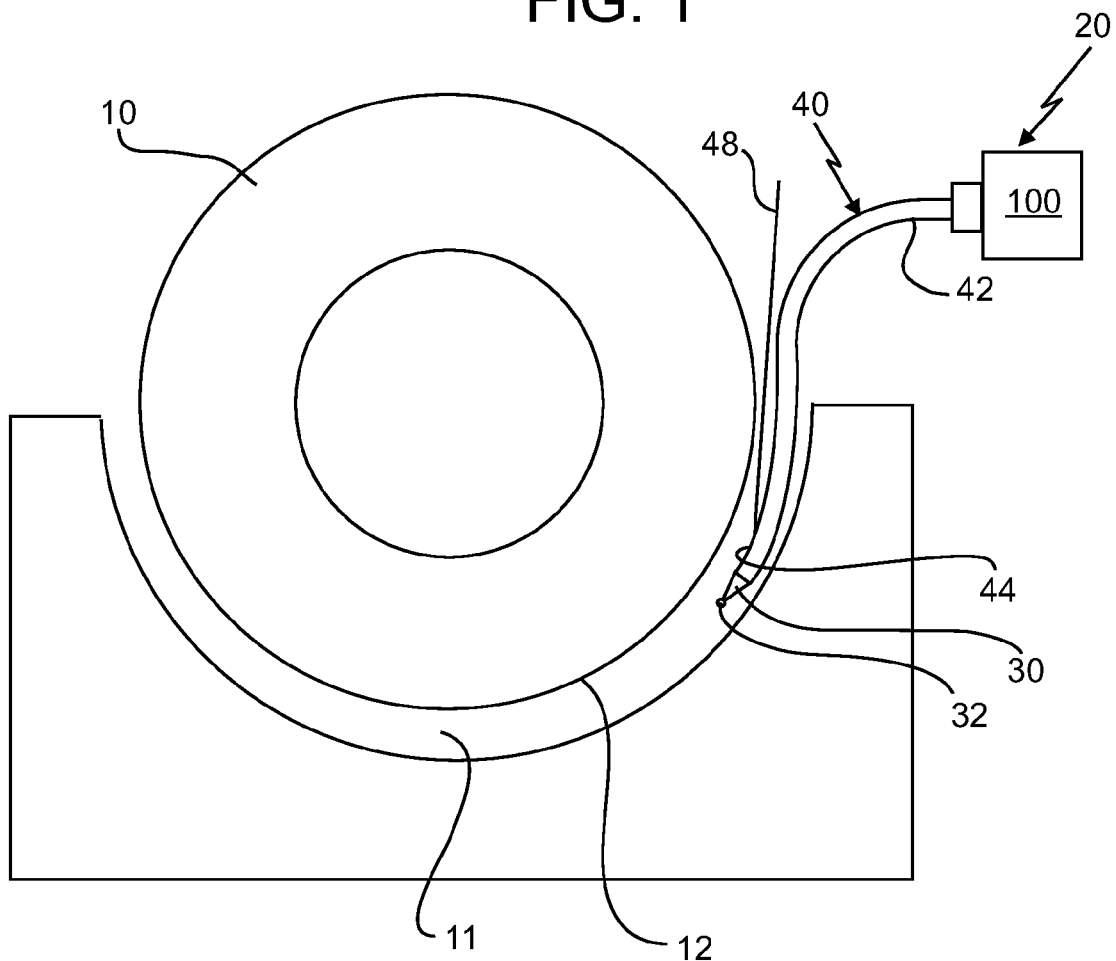
FIG. 1 is a side view of a measuring device for measuring a surface of a rigid object according to an embodiment of the invention.

Referring now to the FIGS. 1-7, a measuring device attachment 20 configured for use with an articulated arm coordinate measuring machine (AACMM) is illustrated. The measuring device attachment 20 may be used in a variety of applications to track at least a portion of a surface 12 of a substantially rigid object 10. The measuring device attachment 20 includes a flexible member 40, such as a tube for example, connected at a first end 42 to a base component 24. A device 30, such as a tactile probe for example, is coupled to a second, opposite end 44 of the flexible member 40. In one embodiment, a generally rigid guide member 48 extends from a portion of the flexible member 40, such as adjacent the first end 42 for example. The guide member 48 may be used to direct movement of the first end 42 and probe 30 of the flexible member 40 through an opening and into contact with a desired surface 12. The flexible member 40 may be formed as a single piece of a desired length, or alternatively, may include a plurality of connected smaller flexible member portions. The sheath 46 of the flexible member 40 is formed from a substantially malleable material, for example an elastomer, such that the flexible member 40 is movable in a large or infinite number of combinations of directions and rotations which allows the measurement device attachment 20 to be used in confined areas, such as gap 11 adjacent the surface 12 for example.

Figure 2:
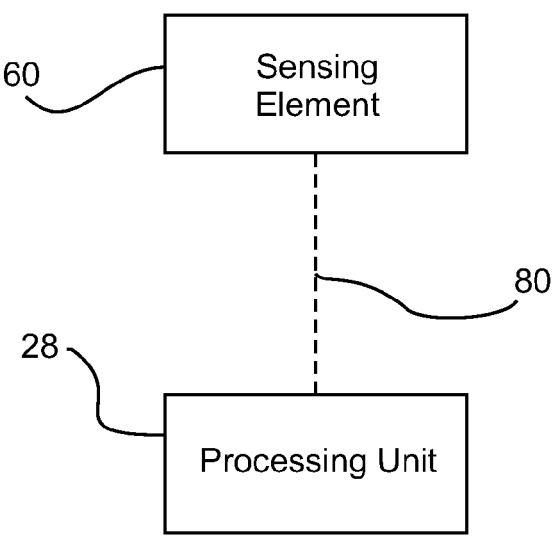
FIG. 2 is a schematic diagram of a control system for the measuring device of FIG. 1 according to an embodiment of the invention.

The flexible member 40 includes at least one sensing element 60 (see FIGS. 2-5) configured to measure the deflection of at least a portion of the flexible member 40 as it bends about a substantially rigid object 10. In one embodiment, one or more wires 80 (FIGS. 2-5) extend through the generally hollow center 43 of the flexible member 40. The wires 80 may be configured to transmit power or data between the sensing element 60 and a processing unit 28, such as a computer for example, as shown in FIG. 2. The processing unit 28 may be positioned within the base component 24, a separate device connected to the base component 24, or within the articulated arm CMM to which the base component is attached. The position and geometry of the flexible member 40 when in a default orientation is stored as a model within the processing unit 28.

Figure 8C:
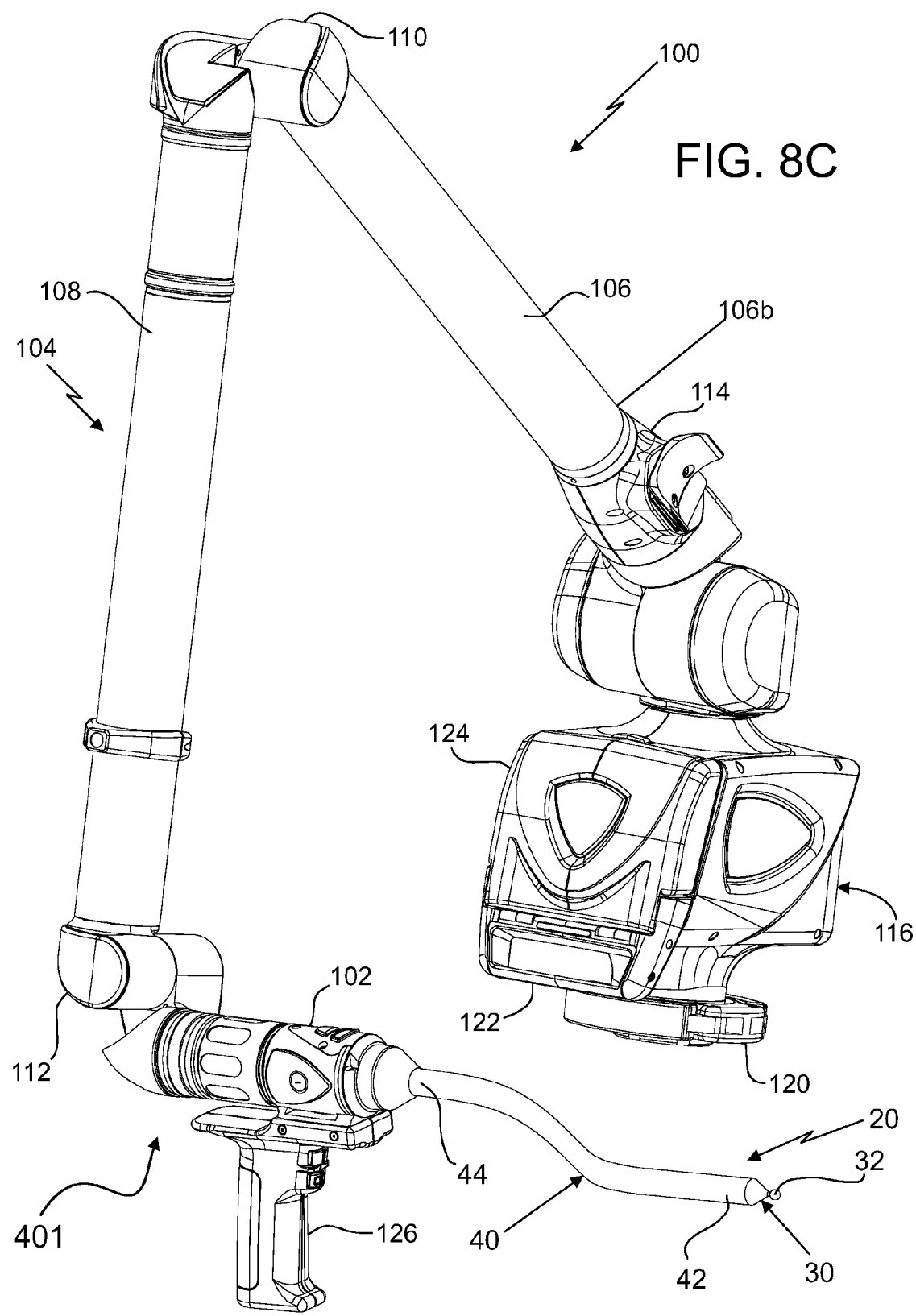
Figure 8D:
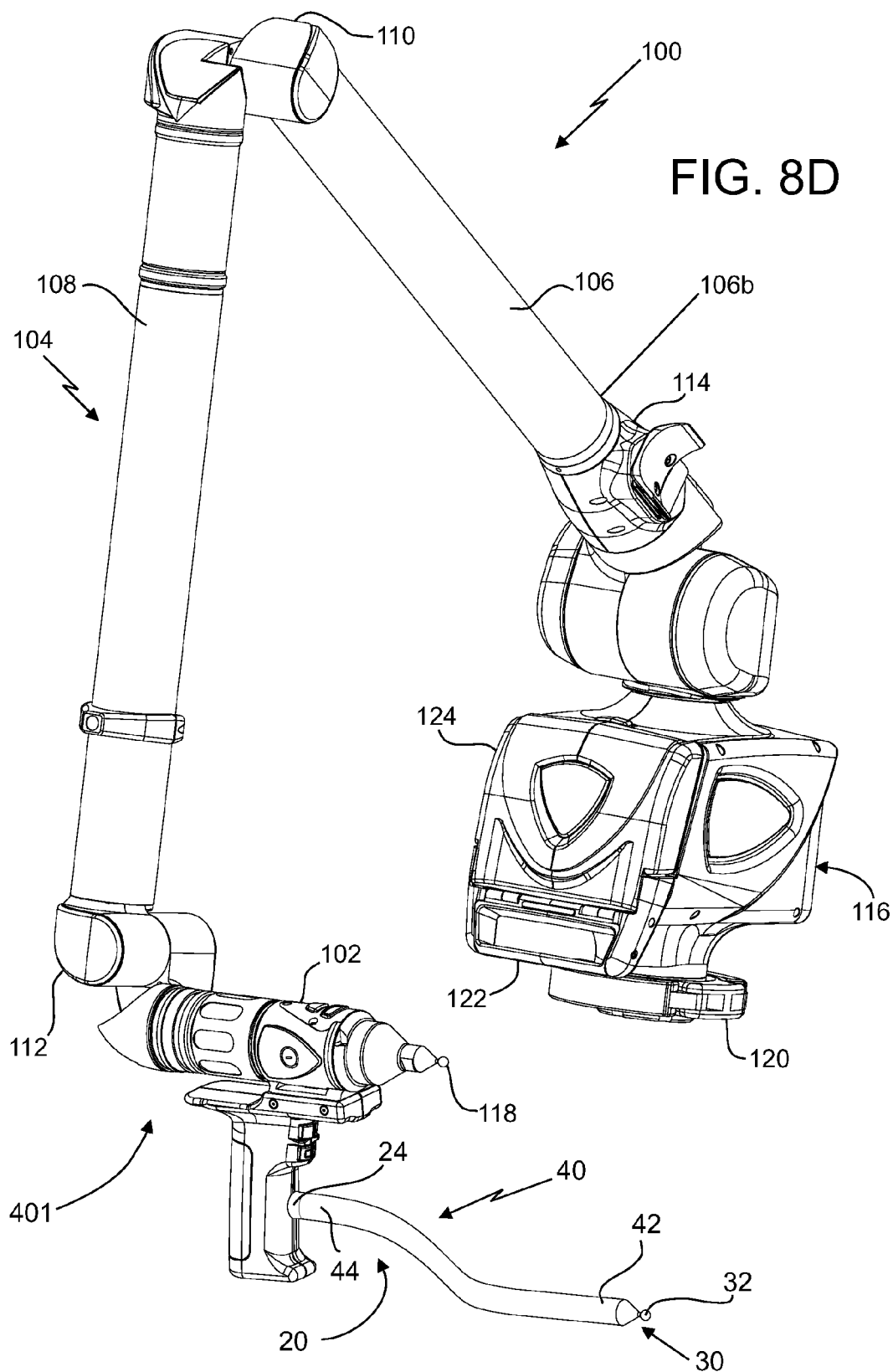
Figure 9A:
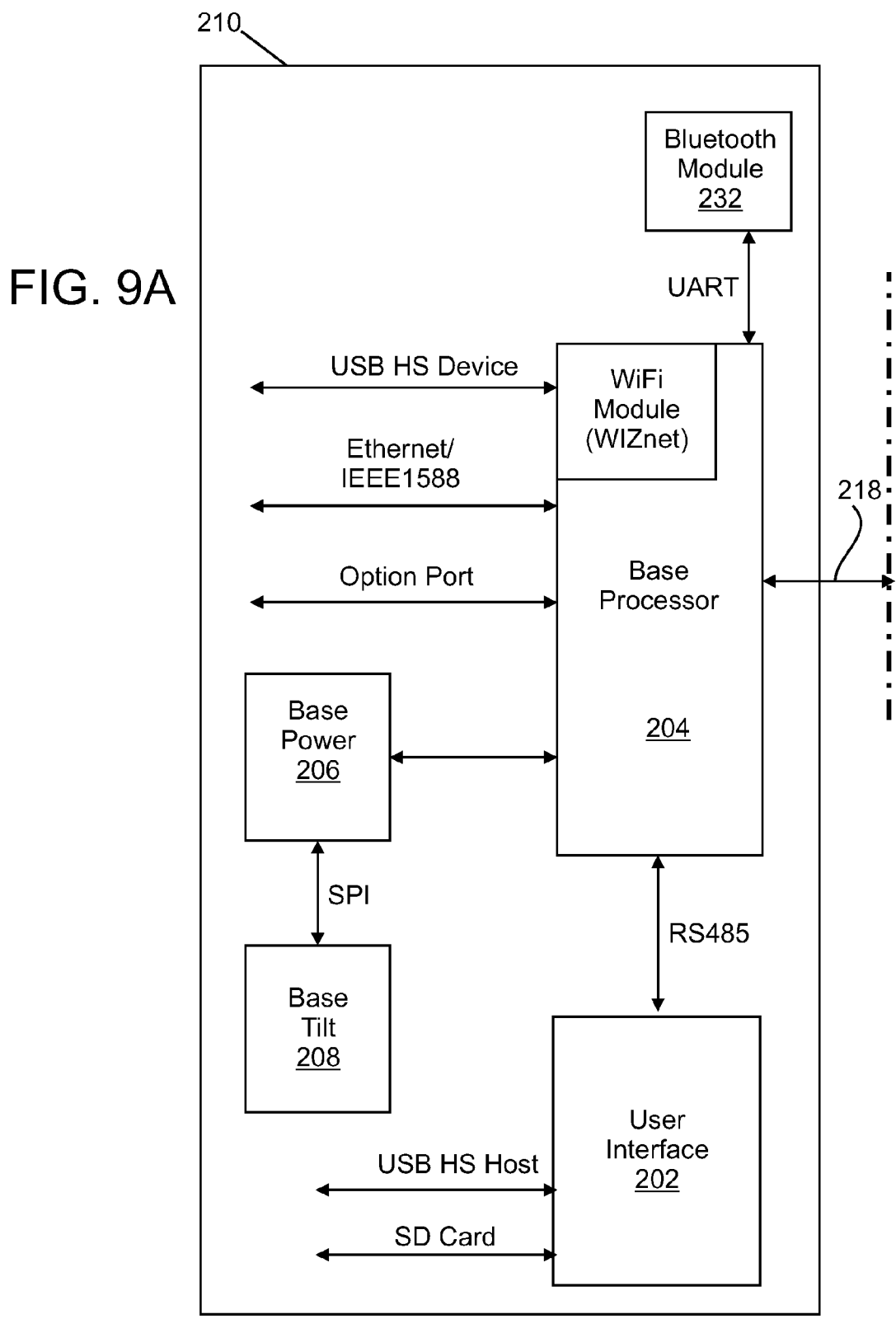
FIG. 9, including FIGS. 9A-9D taken together, is a block diagram of electronics utilized as part of the AACMM of FIG. 8 in accordance with an embodiment of the present invention.
Figure 9B:
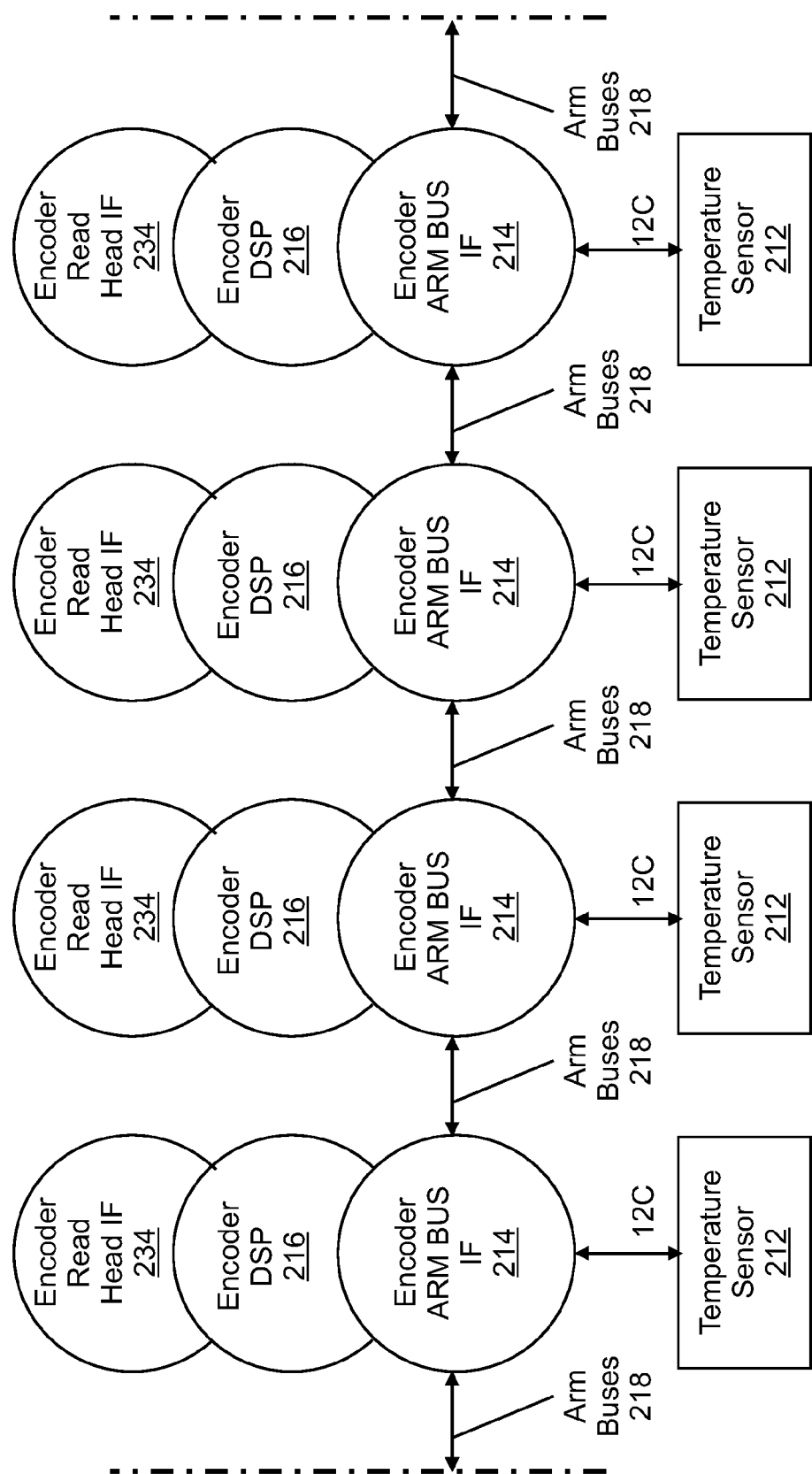
Figure 9C:
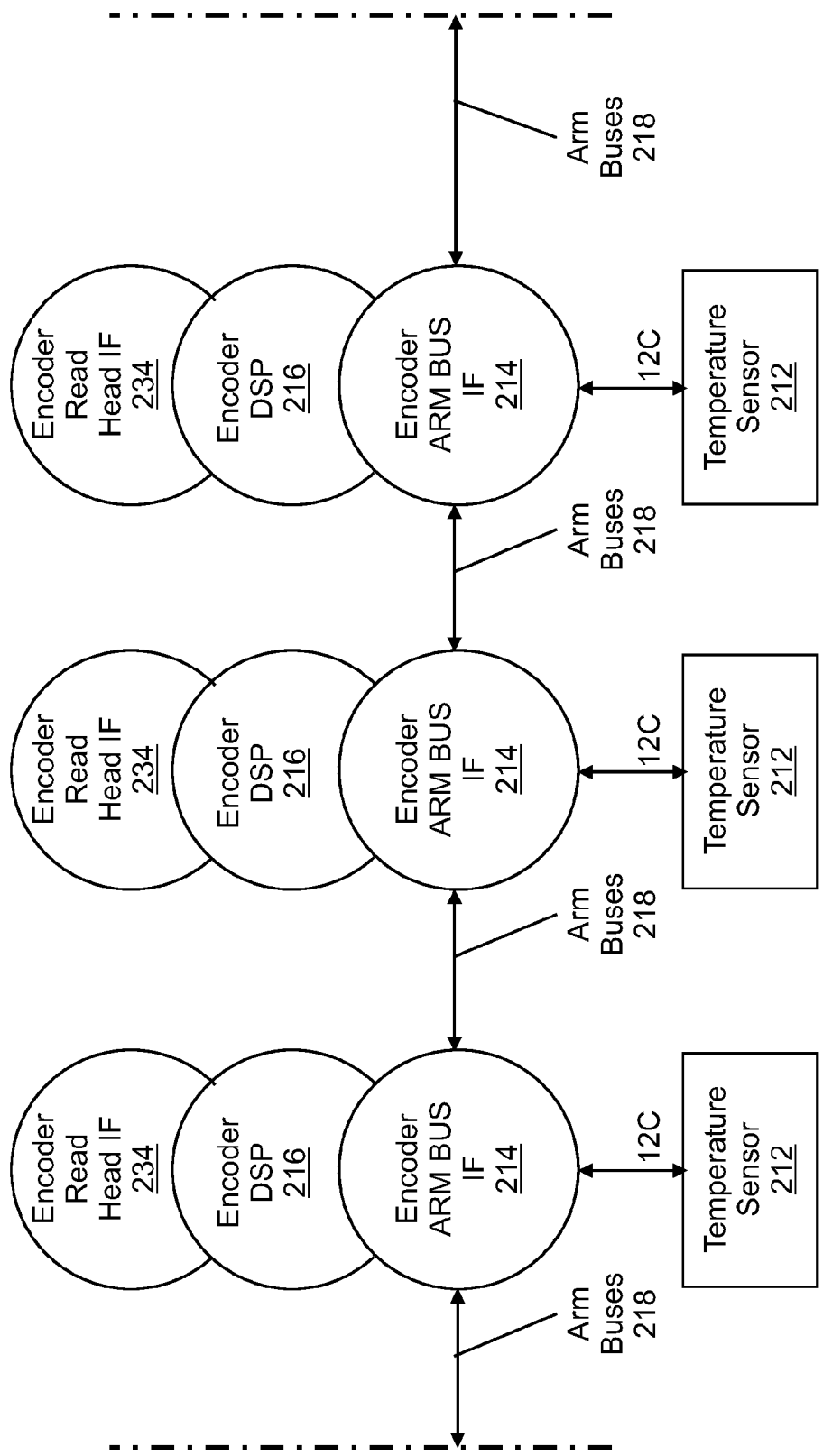
Figure 9D:
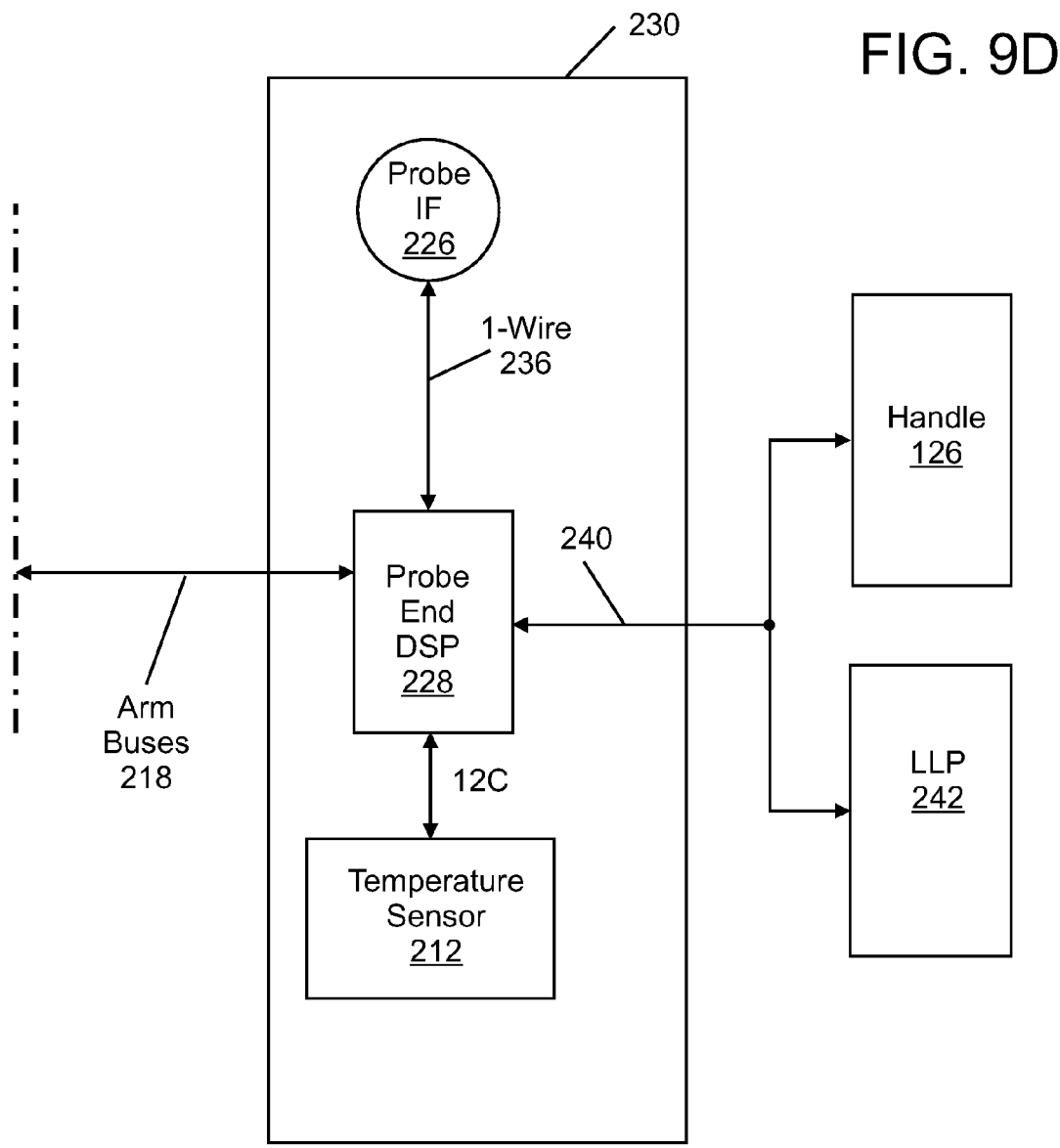
Figure 9:
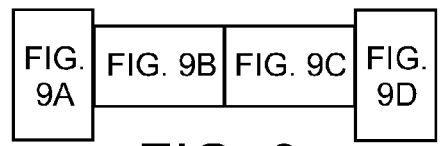

An exemplary portable articulate arm coordinate measuring machine (AACMM) is illustrated in FIGS. 8-10. The AACMM 100 includes a multiple axis articulated measurement device having a probe end 401 that includes a measurement probe housing 102 coupled to an arm portion 104 of the AACMM 100 at one end. The arm portion 104 comprises a plurality of arm segments 106, 108 coupled to one another, to a base 116, and a measurement probe housing 102 by groups of bearing cartridges 110, 112, 114. Though the illustrated AACMM includes a first arm segment 106 and a second arm segment 108, the measuring system 100 configured for use with the measuring device attachment 20 may include any number of arm segments coupled together by bearing cartridges, and thus, more or less than six or seven axes of articulated movement or degrees of freedom. When combined into a group 110, 112, 114, the bearing cartridges may form a hinge and swivel type of connector such that an adjoining component is independently movable about two axes. It should be appreciated that bearing cartridges may be grouped together in different configurations to a form a connector movable about a single axis or a plurality of axes. The measurement probe housing 102 may comprise the shaft of an additional axis of the AACMM 100 (e.g. a cartridge containing an encoder system that determines movement of the measurement device, for example a probe 118, of the AACMM 100.) In this embodiment, the probe end 401 may rotate about an axis extending through the center of measurement probe housing 102. In use of the AACMM 100, the base 116 is typically affixed to a planar work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The AACMM 100 includes at least one removable portion that provides advantages in allowing accessories or functionality to be changed without removing the measurement probe housing 102 from the bearing cartridge grouping 112. For example, the measurement probe housing 102 houses a removable probe 118 adjacent an end, which is a contact measurement device and may have any number of different tips that physically contact the object to be measured, including, but not limited to, ball, touch-sensitive, curved, and extension type probes. The measurement probe housing 102 also includes a detachably mounted handle 126 connected to the middle of the housing 102, by way of, for example, a quick connect interface. The handle 126 may be replaced with another device, such as a bar code reader, or paint sprayer for example to provide additional functionality to the AACMM 100. In one embodiment, the second end 44 of the measurement device attachment 20 is configured to couple to the probe housing 102 in place of the probe 118, such as with a quick connect interface or a threaded interface for example (see FIG. 8C). In another embodiment, the second end 44 of the measuring device attachment 20 is configured to couple to the handle 126 of the probe housing 102 (see FIG. 8D). The measurement probe housing 102 may also include an electrical connector that allows electrical power and data to be exchanged with the attachments and the corresponding electronics located in the probe end 401.

The coupling of measuring device attachment 20 to the probe housing 102 provides advantages in allowing the operator to insert the measuring device attachment 20 into areas otherwise not accessible by the probe 118, such as a hole or a gap 12 for example. In an embodiment, an assembly that includes the probe 118 is detached from the probe housing 102 and replaced with the measuring device attachment 20.

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen for example.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer. In an embodiment, a measurement is made by first using a tactile probe 118 to measure three or more points on an object to establish a frame of reference of the part being measured within the frame of reference of the articulated arm CMM 100. In so doing, measurements made with the flexible measuring device attachment 20 can then also be determined within the frame of reference of the part (or surface) being measured. This registration capability obtained with a tactile probe 118 can alternatively be provided with a scanner attached to the articulated arm CMM. It should be appreciated that coupling the measuring device attachment 20 to the probe housing 102 provides advantages in that the position and orientation of the attachment 20 is known by the electronic data processing system 210 so that the location of the object relative to the AACMM 100 may be ascertained.

FIG. 9 is a block diagram of electronics utilized in an AACMM 100 in accordance with an embodiment. The embodiment shown in FIG. 9A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 9A, the electronic data processing system 210 is in communication with the aforementioned plurality of encoder systems via one or more arm buses 218. In the embodiment depicted in FIGS. 9B and 9C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 9D are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoders are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 10 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 10A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 10B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 10A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 35. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 10. For example, in one embodiment, the base processor board 204 and the user interface board 202 are combined into one physical board.

The base of the measuring device attachment 20 of FIGS. 1-7 may attach to the measurement probe housing 102 of AACMM 100 such that the measuring device attachment 20 functions as one of a plurality of interchangeable attachments configured for use with the AACMM 100. In such embodiments, information from both the measuring device attachment 20 and the AACMM 100 may be used to track an object 10.

Figure 3:
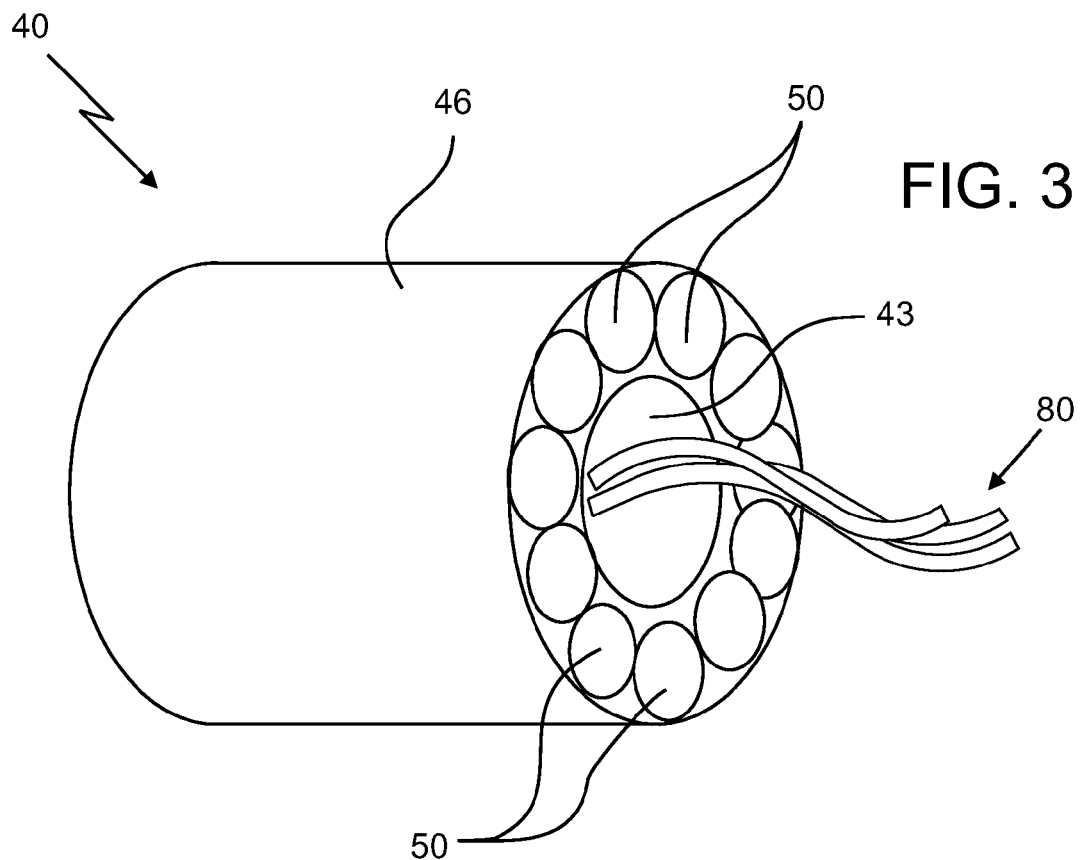
FIG. 3 is a perspective view of a portion of a measuring device according to an embodiment of the invention.
Figure 4:
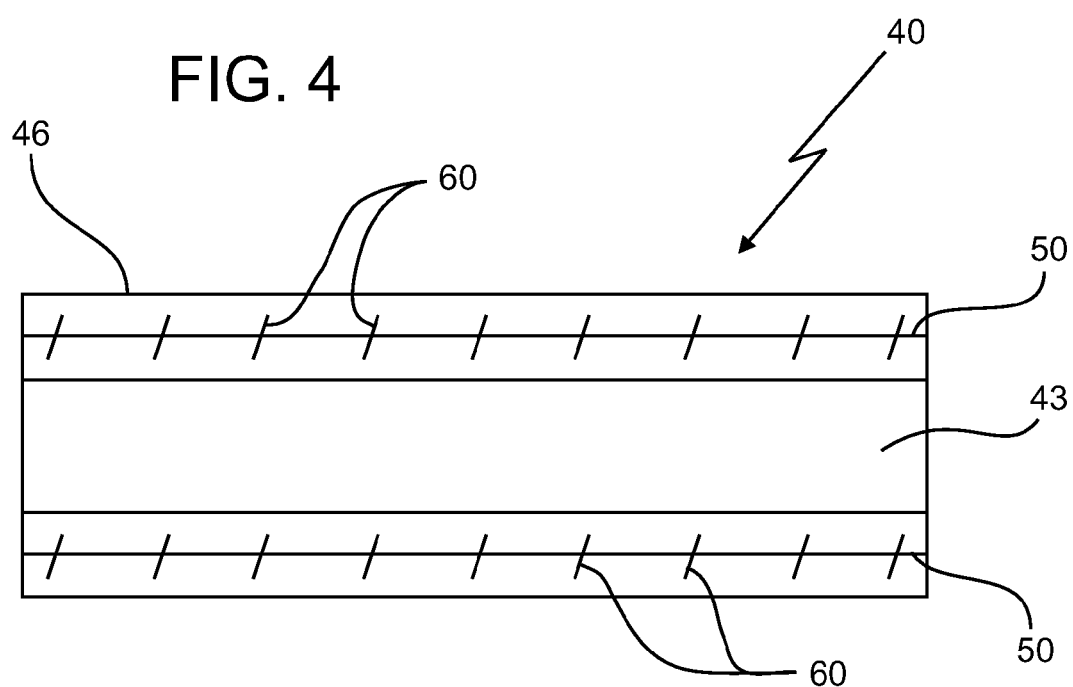
FIG. 4 is a cross-section of a portion of a measuring device according to an embodiment of the invention.

Referring now to FIGS. 3 and 4, in one embodiment, the flexible member 40 of the measuring device attachment 20 includes a plurality of fiber optic cores 50 arranged generally parallel to a central longitudinal axis of the flexible member 40. In one embodiment, the flexible member 40 includes at least three fiber optic cores 50 which in combination are configured to sense the three-dimensional shape of the flexible member 40. In the exemplary embodiment, each of the fiber optic cores 50 may extend over the full length of the flexible member 40, or in another embodiment, may extend over only a portion of the length of the flexible member 40. The at least three fiber optic cores 50 may be arranged as one multi-core optical fiber 50, a plurality of single core optical fibers 50, or some combination thereof. In one embodiment, the fiber optic cores 50 are embedded within the sheath 46 and are equidistantly spaced around the periphery of the flexible member 40 to prevent mode coupling between adjacent optical fiber cores 50. Referring now to FIG. 4, each fiber optic core 50 includes an array of sensing elements 60 spaced at intervals along the length of the flexible member 40. Exemplary sensing elements 60 include fiber Bragg gratings (FBG), which measure the strain on the fiber optic core 50 at the location of each sensing element 60. For example, when a force is applied to a portion of the flexible member 40, the resultant deflection of the fiber optic cores 50 causes at least one sensing element 60 to either stretch or compress. This results in a change in the modulation period of the FBG 60, which in turn, causes a shift in the frequency reflected by the FBG 60. The magnitude of the external stimulus applied to the flexible member 40 at a location is determined by measuring the shift in the frequency of the FBG 60 at that location.

The tip 32 of the probe 30 mounted at the second end 44 of the flexible member 40 (FIG. 1) is configured to contact the surface 12 of the object 10. To determine the location of the tip 32 as it contacts the surface 12 of the rigid object 10, the relative spatial relationship between the sensing elements 60 and the portion of the surface 12 that the probe 30 is contacting is determined. In one embodiment, a sensing element 60 may be collocated with the tip 32 of the probe 30. In yet another embodiment, a sensing element 60 may be arranged elsewhere on the probe 30 in a known fixed relationship to the tip 32.

Figure 5:
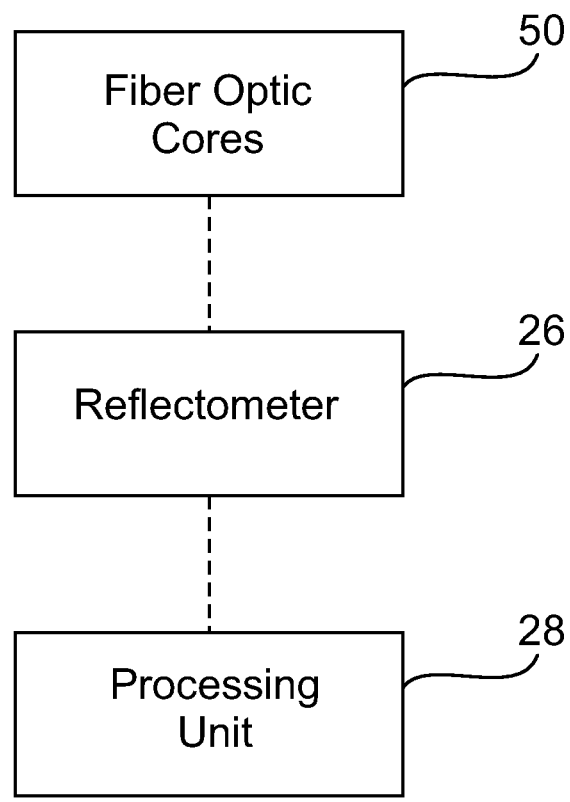
FIG. 5 is a schematic diagram of a control system for the measuring device of FIG. 4 according to an embodiment of the invention.

As illustrated in FIG. 5, the fiber optic cores 50 within the flexible member 40 are operably coupled to a reflectometer 26, such as a frequency domain reflectometer or another similar device for example, housed within the base component 24. A reflectometer, also referred to as a spectrophotometer, is an instrument used to transmit light and receive reflected light within the fiber optic cores 50 to measure the intensity of light through the cores 50 as a function of the light's wavelength. In addition, a reflectometer may measure the diffusivity of light for each known wavelength range. Any reflectometer 26 known to those of ordinary skill in the art may be employed for the present invention provided that it is capable of monitoring a plurality of sensing elements 60 at one time. The processing unit 28 is operably coupled to the reflectometer 26. In one embodiment, the reflectometer 26 and/or the processing unit 28 may be housing within a portion of the AACMM 100.

The processing unit 28 converts the signals from the reflectometer 26 into strain measurements, which may be correlated into a plurality of local bend measurements. A local bend measurement is the bend calculated between a first sensing element 60 and an adjacent sensing element 60 in the array. The processing unit 28 determines the local bend measurements at each individual sensing element 60 along the length of the flexible member. The plurality of local bend measurements are then applied to the model of the flexible member 40 stored within the processing unit to determine the overall shape and position of the flexible member 40, and particularly the tip 32 of the probe 30.

Figure 6:
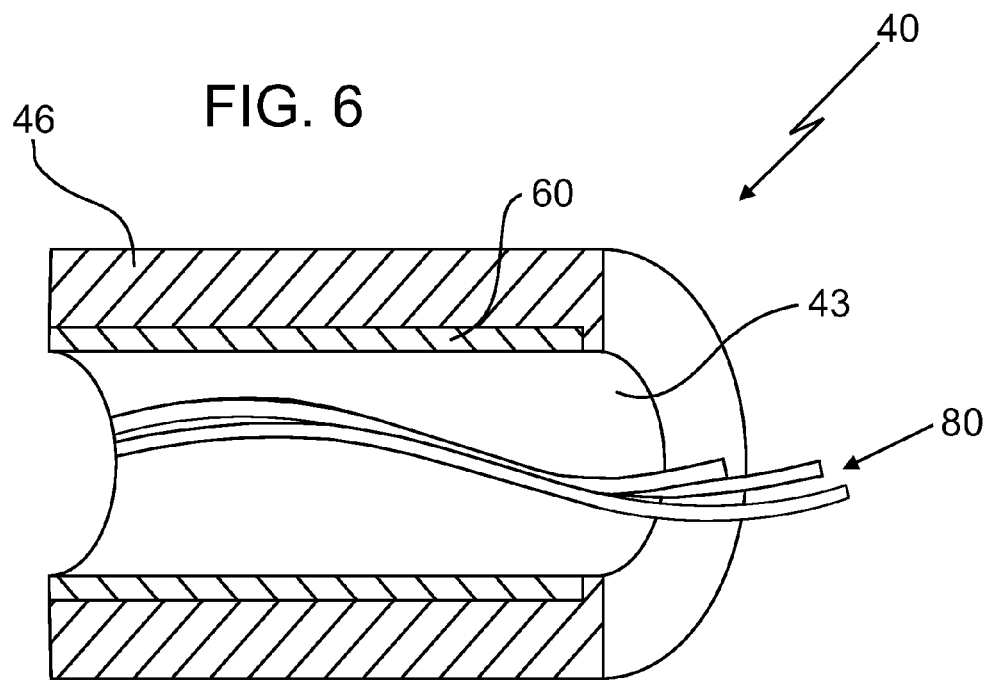
FIG. 6 is a cross-section of a portion of a measuring device according to an embodiment of the invention.

Referring now to another embodiment illustrated in FIG. 6, the at least one sensing element 60 within the flexible member 40 is a piezoelectric sensor. The sensing element 60 may be fabricated from a piezopolymer, or a polymer having piezoelectric properties, such as polyvinylidene fluoride (PVDF) for example. A plurality of piezoelectric sensing elements 60 having a limited length may be positioned at intervals along the length of the flexible member 40, or a single sensing element 60 may extend from a first end 42 to the second, opposite end 44 of the flexible member 40. In one embodiment, the at least one piezoelectric sensing element 60 extends about the circumference of the sheath 46. The at least one piezoelectric sensing element 60 may be formed within a single layer of the sheath 46 of the flexible member 40, or may be formed within a plurality of layers of the sheath 46. In embodiments where the sheath 46 includes multiple layers of piezoelectric sensing elements 60, the layers may be directly adjacent one another or may be separated from each other by at least one layer that does not include a piezoelectric sensing element 60. Inclusion of multiple layers of piezoelectric sensing elements 60 increases the measurement accuracy when determining the deflection of the flexible member 40. The piezoelectric sensing element(s) 60 may be attached to one another, or to a portion of the sheath 46, using any suitable method, process, structure, or means including, but not limited to, heat compression, and/or adhesive.

As the piezoelectric sensing element 60 within the flexible member 40 bends to fit around a portion of the rigid object 10, an electrical charge is generated within the sensing element 60. The voltage of the electrical charge is proportional to the bending moment of the piezoelectric sensing element 60, and can be used to determine the position and shape of the flexible member 40 at that location. Each piezoelectric sensing element 60 is operably coupled to the processing unit 28 such that the voltage measurement signals from each piezoelectric sensing element 60 are provided to the processing unit 28 via an electrical connection. Referring again to FIG. 2, the at least one piezoelectric sensing element 60 may be operably coupled to the processing unit 28 through one or more wires, such as wires 80 for example, or alternatively, through a wireless connection. The processing unit 28 processes the voltage measurement signals received from a piezoelectric sensing element 60 to determine the local bending moment at that piezoelectric sensing element 60. The measured bending moments are then applied to the model of the flexible member 40 stored within the processing unit 28 to determine the overall position and shape of the flexible member 40.

Figure 7:
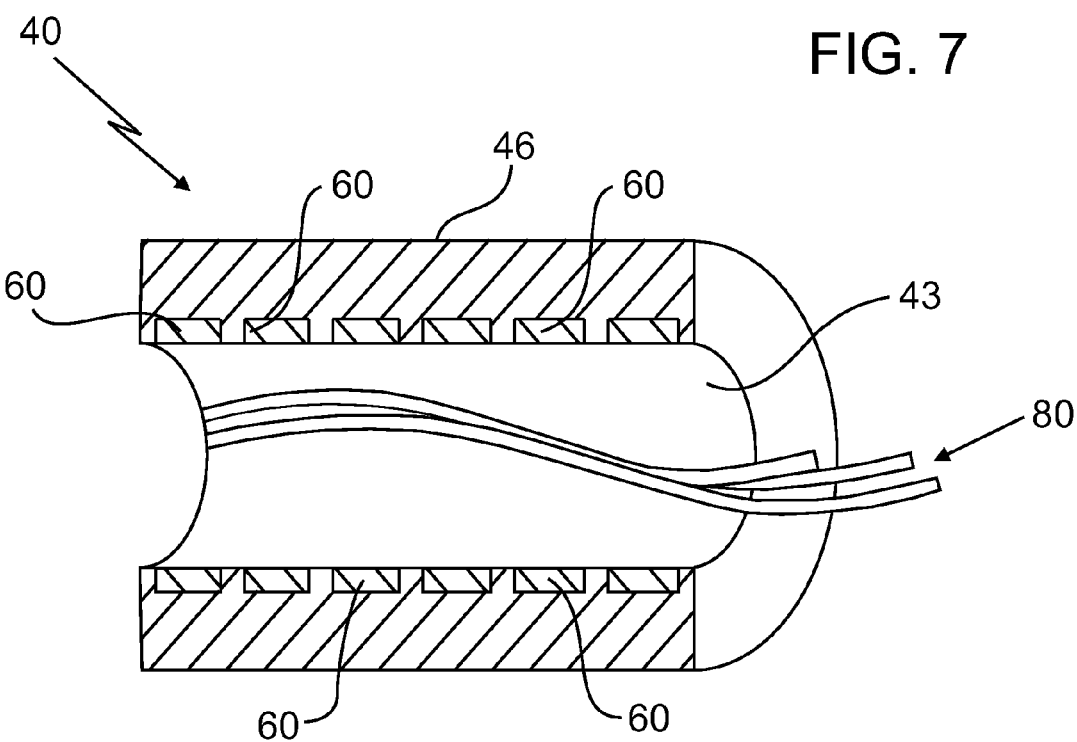
FIG. 7 is a cross-section of a portion of a measuring device according to an embodiment of the invention.

In yet another embodiment, illustrated in FIG. 7, the at least one sensing element 60 is a sensor configured to measure stress. For example, the sensing elements 60 may be resistive, inductive, or capacitive strain gauges. The flexible member 40 includes a plurality of stress sensing elements 60 arranged in at least one linear array along the length flexible member 40 to measure the deflection or deformation in three dimensions. For example, a first array of stress sensing elements 60 is configured to measure strain forces on the flexible member 40 in a first direction and a second and third array of stress sensing elements 60 are configured to measure the strain forces on the flexible member 40 in two directions, each orthogonal to the first direction. The stress sensing elements 60 may be coupled to the exterior of the sheath 46, mounted to the interior of the sheath 46, or alternatively, embedded within a portion of the sheath 46. At least some of the plurality of stress sensing elements 60 may be arranged in a known Wheatstone bridge configuration and may be coupled to the processing unit 28, such as with the plurality of wires 80.

When a force is exerted on a portion of the flexible member 40, the flexible member 40 bends such that some of the stress sensing elements 60 are stretched and some opposing stress sensing elements 60 are compressed. As the stress sensing elements 60 deform, the resistance in the wires coupled to the stress sensing element 60 changes accordingly. With a constant voltage being applied over the wires, the current can be used to measure the pressure exerted on each of the stress sensing elements 60. The magnitude of the resistance changes indicate the degree of bending of the flexible member 40 in a given direction. By applying the local bending measured at each of the stress sensing elements 60 along the length of the flexible member 40 to the model of the flexible member 40, the processing unit 28 determines the overall shape and position of the flexible member 40, and therefore the position of the tip 32 of the probe 30.

The flexible member 40 of the measuring device attachment 20 provides advantages since it is non-articulated, and therefore provides a greater range of motion than conventional measuring systems. This greater range of motion allows the measuring device attachment 20 to be used in a large number of applications.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measuring machine for measuring three-dimensional coordinates of an object in space, comprising:
    a base;
    a manually positionable arm rotationally coupled to the base at a first end, the arm including at least one arm segment, each arm segment including at least one position transducer for producing a position signal;
    an electronic circuit which receives the position signal from the at least one position transducer;
    a non-articulated measurement device coupled to the second end of the arm, the non-articulated measurement device including:
        a flexible member including at least one sensing element configured to sense deflection of an adjacent portion of the flexible member;
        a probe connected to a second end of the flexible member, the probe being configured to contact a surface of an object; and
        a processing unit operably coupled to the at least one sensing element to sense deflection thereof, the processing unit having a stored model of the flexible member such that the processing unit is configured to apply the deflection sensed of the at least one sensing element to the model to determine the position and shape of the flexible member; and
    a processor coupled to the electronic circuit, the processor being configured to determine the three-dimensional coordinates of a point on the object in response to receiving the position signal from the at least one position transducer and in response to receiving position signals from the processing unit.

2. The portable articulated arm coordinate measuring machine according to claim 1, wherein the flexible member is configured to connect to an end of the measurement probe housing.

3. The portable articulated arm coordinate measuring machine according to claim 1, wherein the flexible member is configured to connect to a generally central portion of the measurement probe housing.

4. The portable articulated arm coordinate measuring machine according to claim 1, wherein the at least one wire is arranged within a generally hollow portion of the flexible member.

5. The portable articulated arm coordinate measuring machine according to claim 1, further comprising:
    at least three fiber optic cores formed within a sheath of the flexible member, the fiber optic cores being arranged parallel to a longitudinal axis of the flexible member; and
    an array of sensing elements mounted at intervals along a length of each fiber optic core.

6. The portable articulated arm coordinate measuring machine according to claim 5, wherein the sensing elements are fiber Bragg gratings.

7. The portable articulated arm coordinate measuring machine according to claim 5, further comprising a reflectometer coupled to the at least three fiber optic cores.

8. The portable articulated arm coordinate measuring machine according to claim 7, wherein the reflectometer is mounted within the base component.

9. The portable articulated arm coordinate measuring machine according to claim 8, wherein the processing unit converts signals from the reflectometer into local bend measurements for each of the plurality of sensing elements.

10. The portable articulated arm coordinate measuring machine according to claim 5, wherein the at least three fiber optic cores extend from a single fiber having multiple cores.

11. The portable articulated arm coordinate measuring machine according to claim 5, wherein the sheath includes multiple fibers, each having a single fiber optic core.

12. The portable articulated arm coordinate measuring machine according to claim 1, wherein the at least one sensing element is a piezoelectric film.

13. The portable articulated arm coordinate measuring machine according to claim 12, wherein the piezoelectric film extends about a circumference of the flexible member and from the first end to the second end.

14. The portable articulated arm coordinate measuring machine according to claim 13, wherein a sheath of the flexible member is formed having at least one layer of piezoelectric film.

15. The portable articulated arm coordinate measuring machine according to claim 1, wherein the at least one sensing element is a stress sensor.

16. The portable articulated arm coordinate measuring machine according to claim 15, wherein multiple arrays of stress sensors are arranged generally linearly from the first end to the second end of the flexible member.

17. The portable articulated arm coordinate measuring machine according to claim 16, wherein the stress sensor is one of a capacitive, inductive, or resistive strain gauge.

18. The portable articulated arm coordinate measuring machine according to claim 1, further comprising a measurement probe housing coupled to a second end of the arm.

19. A method of operating a portable articulated arm coordinate measuring machine for measuring three-dimensional coordinates of an object in space, comprising:
proviging a manually positionable arm including one or more arm segments having at least one position transducer for producing a position signal;
receiving the position signals from the at least position transducer at an electronic circuit;
providing a measurement device attachment coupled to the arm and the electronic circuit, the attachment including a flexible member having at least one sensing element;
determining a local bend measurement of the flexible member based on the deflection of the at least one sensing element of the flexible member;
applying the local bend measurement to a stored model of the flexible member to determine a current position and shape of the flexible member; and
determining three-dimensional coordinates of a point on the object based at least in part on the determined position and shape of the flexible member and the position signals.

* * * * *